United States Patent

Sabec

[11] 4,023,838
[45] May 17, 1977

[54] WORK VEHICLE PROTECTIVE COVER

[75] Inventor: Charles J. Sabec, Chagrin Falls, Ohio

[73] Assignee: Towmotor Corporation, Mentor, Ohio

[22] Filed: June 17, 1976

[21] Appl. No.: 697,301

[52] U.S. Cl. .................................. 296/102; 52/93
[51] Int. Cl.² ........................................ B62D 25/06
[58] Field of Search .................. 296/102; 280/756; 52/93, 720

[56] References Cited
UNITED STATES PATENTS

| | | | |
|---|---|---|---|
| 2,805,887 | 9/1957 | Selby | 296/102 |
| 3,455,599 | 7/1969 | Becker | 296/102 |
| 3,787,085 | 1/1974 | Bucher et al. | 296/102 |
| 3,964,782 | 6/1976 | Pernicka et al. | 296/102 |

*Primary Examiner*—Robert R. Song
*Attorney, Agent, or Firm*—Frank L. Hart

[57] ABSTRACT

A protective cover of a work vehicle has first and second frame members of a general U configuration connected to the vehicle at spaced apart locations with each frame member generally spanning the width of the vehicle with an operator's station position between said frame members. First and second supporting members of unique configuration are connected to the frame members and support an overlying roof member at preselected spaced apart locations.

6 Claims, 7 Drawing Figures

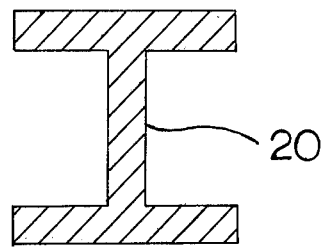
Fig-3-
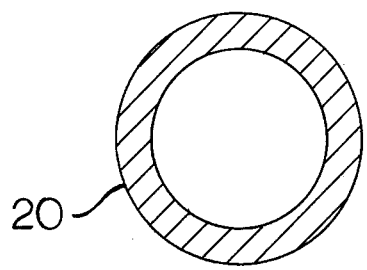
Fig-4-
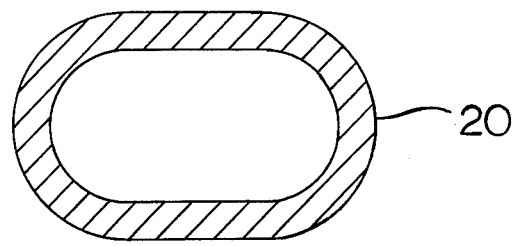
Fig-5-
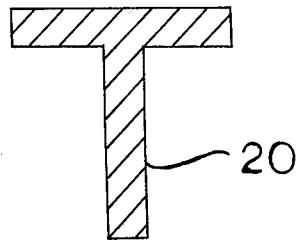
Fig-6-
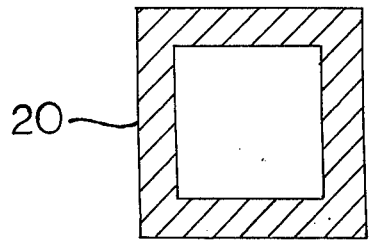
Fig-7-

WORK VEHICLE PROTECTIVE COVER

BACKGROUND OF THE INVENTION

In the construction of work vehicles, it is often necessary to provide a protective roof over the operator's station to protect the operator against injury from falling objects. Depending upon the expected use of the vehicle, it is sometimes desirable to provide a roof assembly of relatively rugged construction and of a construction which will withstand heavy impacts from both above and against a side of the roof.

This invention therefore resides in a protective cover for a work vehicle which is constructed to be of increased strength and to withstand heavy impacts directed against a side of the roof member.

BRIEF DESCRIPTION OF THE DRAWINGS

FIGS. 3–7 are diagrammatic cross sectional views of different embodiments of the frame member.

DETAILED DESCRIPTION OF THE INVENTION

Figure 1:
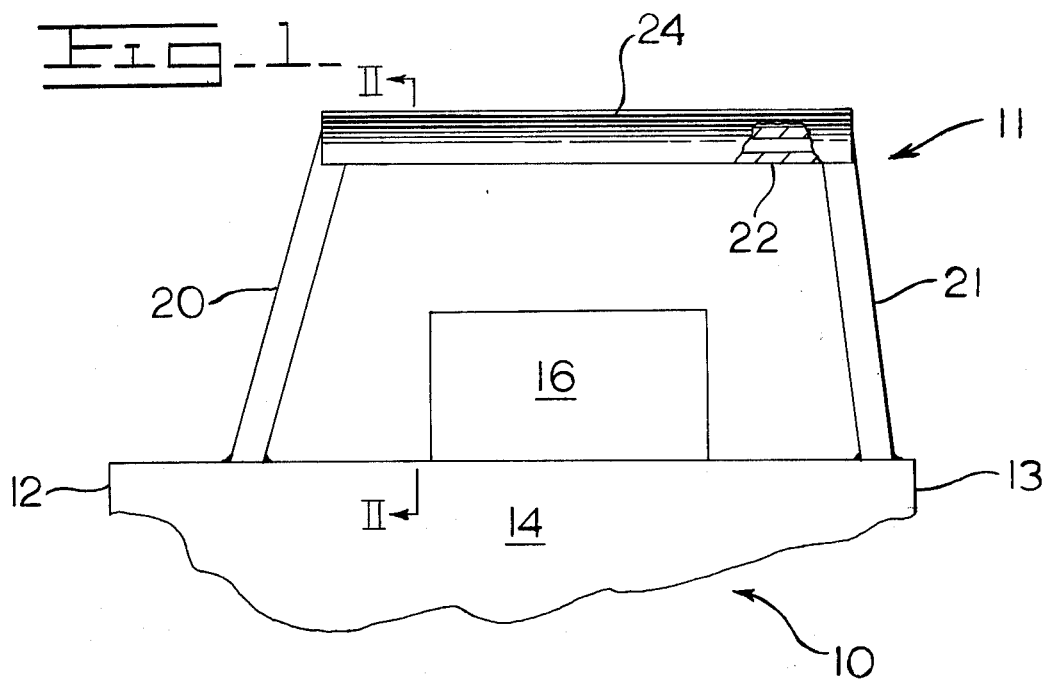
FIG. 1 is a diagrammatic side view of a portion of a work vehicle having the apparatus of this invention.

Referring to FIG. 1, a work vehicle 10 has the protective cover 11 of this invention. The vehicle 10 has front and rear ends 12,13, first and second sides (FIGS. 1 and 2) 14,15 a width defined by said first and second sides 14,15 and an operator's station 16 which generally has a seat and vehicle controls (not shown).

The protective cover 11 extends over the operator station 16 and has first and second frame members 20,21, first and second supporting members 22,23 (FIG. 2), and a roof member 24.

Figure 2:
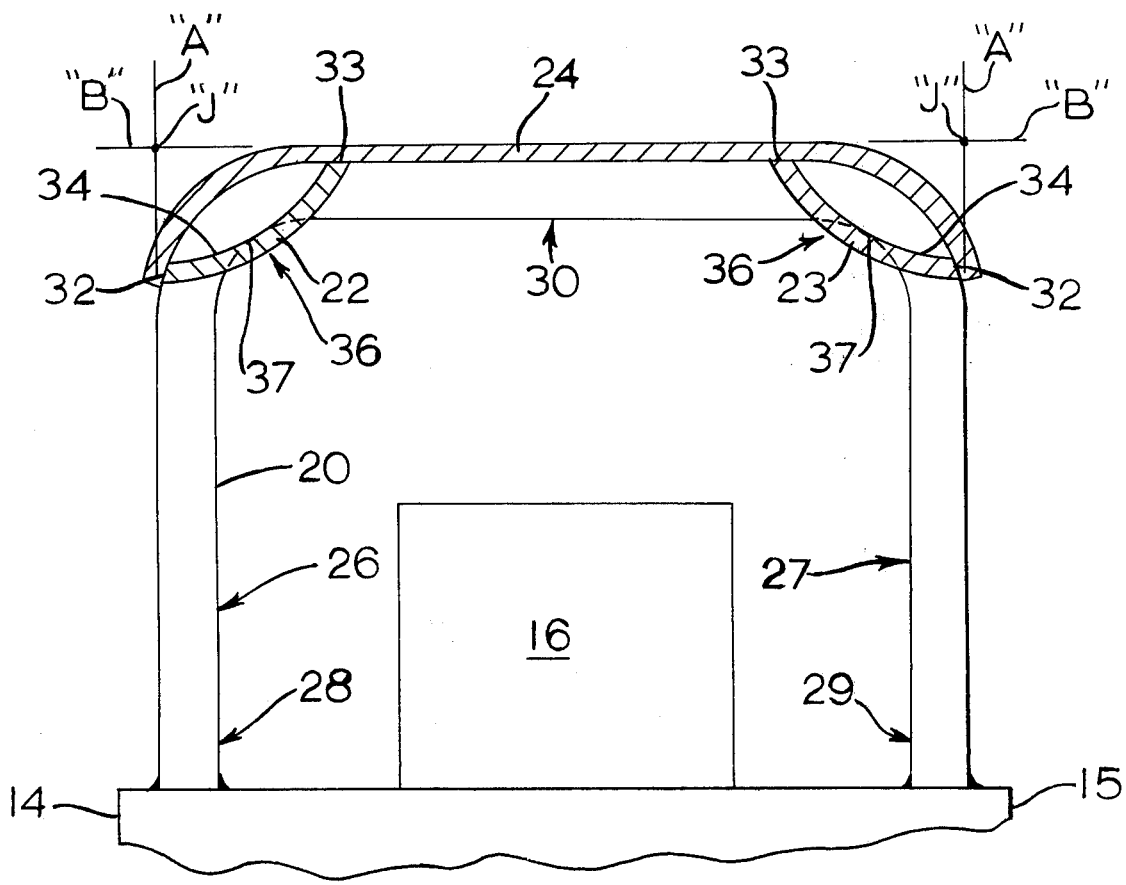
FIG. 2 is a diagrammatic end view in partial section of one of the frame members with its associated supporting member and roof member.

Referring to FIGS. 1 and 2, the frame members 20,21 each are of an inverted, general U configuration and have first and second legs, leg end portions 28,29 and a middle portion 30 connecting the legs 26,27. Preferably, each of said frame members 20,21 are a unitary element. The frame members 20,21 can be of various cross sectional configurations such as, for example, tubular, rectangular, oval, I, or T, as shown in FIGS. 4–8.

The leg portions 28,29 of each frame member 20,21 are connectable, for example, by welding. The leg portions 28,29 of each frame member 20,21 are connected adjacent opposed sides 14,15 of the vehicle 10 and respectively adjacent opposed ends 12,13 of the vehicle 10 (FIG. 1). In the installed position on the vehicle 10, the frame members 20,21 stand generally upright with the middle portion 30 of each frame member 20,21 generally spanning the width of the vehicle 10 and with the frame members 20,21 being adjacent opposed ends of the operator's station 16.

The first and second supporting members 22,23 are each of arcuate cross sectional configuration and the first and second ends, first and second longitudinally extending edge portions 32,33 and a concave surface 34. The first and second end portions of each supporting member 22,23 are connected to the first and second frame members 20,21 generally at the juncture of the leg 26 or 27 and bottom portion 30 of the frame members 20,21.

The supporting members 22,23 are oriented with their concave surface 34 directed outwardly from the vehicle 10 with the first edge portion 32 extending generally along the plane A of the outer surface of the respective associated frame member leg 26 and the second edge portion 33 extends along the plane B of the outer surface of the frame member middle portion 30.

The supporting members 22,23 are each of a configuration sufficient for connecting middle portions 36 of the supporting members 22,23 to each frame member 20,21 at locations adjacent the inner juncture surface 37 of the associated leg 26 or 27 and middle portion 30 of said frame member 20,21. This connection is preferably by welding. Also, the configuration is sufficient for positioning the second edge portion 33 a greater distance from the juncture "J" of the associated planes A, B than the first edge portion 32 from said respective juncture J. The distance between the first and second frame members 20,21 (FIG. 1) is also greater than the distance between the first and second legs 26,27 (FIG. 2) of each frame member 20,21.

The roof member 24 overlays the middle portion 30 of the first and second frame members 20,21 and the operator's station 16 and is in supporting contact with and connected to the first and second edge portions 32,33 of the supporting members 22,23. The roof member 24 extends downwardly at each side and is preferably formed of material that is common with the material from which the supporting members 22,23 are constructed.

By extending the frame members 20,21 across the width of the vehicle 10, the protective cover is of greater strength and is able to withstand greater impact forces. The positioning and configuration of the supporting members 22,23 increase the strength against impacts from a multiplicity of directions and more ruggedly support the roof member 24 at wider spaced locations while maintaining the construction inexpensive and relatively lightweight.

Other aspects, objects, and advantages of this invention can be obtained from a study of the drawings, the disclosure, and the appended claims.

What is claimed is:

1. A protective cover for a work vehicle having front and rear ends, first and second sides, a width, and an operator's stations, comprising:

first and second frame members each of an inverted general U configuration having first and second legs, leg end portions, and a middle portion connecting the legs, said leg end portions of each frame member being connectable adjacent opposed sides of the vehicle and said frame members each being positionable adjacent opposed ends of the vehicle with the operator's station therebetween and the middle portions generally spanning the width of the vehicle;

first and second supporting members each having an arcuate cross sectional configuration, first and second end portions, first and second longitudinally extending edge portions, and a concave surface, said first and second end portions of each supporting member being connected to the first and second frame members generally at a juncture of the leg and middle portion of the frame member and oriented with said supporting members each having the concave surface directed outwardly, said first edge portions extending generally along the plane of the respective frame member legs and said second edge portions extending generally along the plane of the frame member middle portions; and a roof member overlaying the first and second frame members and the operator's station and being in supporting contact with and connected to the first and second edge portions of the first and second supporting members.

2. Apparatus, as set forth in claim 1, wherein the supporting members are each of a configuration sufficient for connecting middle portions of the supporting member to each frame member at locations adjacent the inner juncture surface of the associated leg and middle portion of said frame member.

3. Apparatus, as set forth in claim 1, wherein the roof member and supporting members are formed of common material.

4. Apparatus, as set forth in claim 1, wherein each supporting member is of a configuration sufficient for positioning the second edge portion a greater distance from the juncture of the planes of the frame middle portions and the associated leg portions than the first edge portion from the juncture of said planes.

5. Apparatus, as set forth in claim 1, wherein the distance between the first and second frame members is greater than the distance between the first and second legs of each frame member.

6. Apparatus, as set forth in claim 1, wherein the cross sectional configuration of the frame members is one of tubular, rectangular, oval, I, or T.

* * * * *